United States Patent [19]
Crittenden et al.

[11] Patent Number: 5,182,030
[45] Date of Patent: Jan. 26, 1993

[54] REGENERATION OF ADSORBENTS USING ADVANCED OXIDATION

[75] Inventors: John C. Crittenden, Houghton, Mich.; Sawang Notthakun, Bangkok, Thailand; David W. Hand, Houghton; David L. Perram, Allouez, both of Mich.

[73] Assignee: Board of Control of Michigan Technological University, Houghton, Mich.

[21] Appl. No.: 766,569

[22] Filed: Sep. 27, 1991

[51] Int. Cl.⁵ ............................................. C02F 1/28
[52] U.S. Cl. ...................................... 210/748; 134/1; 502/20
[58] Field of Search ............... 210/673, 679, 748; 134/1; 502/20, 417, 56, 400

[56] References Cited

U.S. PATENT DOCUMENTS

| | | |
|---|---|---|
| 3,844,915 | 10/1974 | Takamizawa et al. . |
| 3,846,296 | 11/1974 | Hay . |
| 3,887,490 | 6/1975 | Schreyer et al. . |
| 3,912,625 | 10/1975 | Case et al. . |
| 4,012,321 | 3/1977 | Koubek . |
| 4,204,979 | 5/1980 | Hobbs et al. . |
| 4,294,703 | 10/1981 | Wilms et al. . |
| 4,551,437 | 11/1985 | Berrebi . |
| 4,692,431 | 9/1987 | Weller .................. 210/679 |
| 4,735,728 | 4/1988 | Wemhoff . |
| 4,751,005 | 6/1988 | Mitsui et al. . |
| 4,861,484 | 8/1989 | Lichtin et al. . |
| 4,867,840 | 9/1989 | Roxlo et al. . |
| 4,954,465 | 9/1990 | Kawashima et al. . |
| 4,955,208 | 9/1990 | Kawashima et al. . |
| 5,087,374 | 2/1992 | Ding .................. 210/673 |

Primary Examiner—Frank Sever
Attorney, Agent, or Firm—Daniel H. Bliss

[57] ABSTRACT

The present invention is a method of purifying fluid having organic material. The method comprises two operational steps. The first step includes passing the fluid through an adsorbent such that the organic material is substantially adsorbed by the adsorbent and the fluid is substantially purified. The second step includes destroying the adsorbed organic material on the adsorbent and regenerating the adsorbent in a form substantially free of adsorbed organic material.

16 Claims, No Drawings

REGENERATION OF ADSORBENTS USING ADVANCED OXIDATION

BACKGROUND OF THE INVENTION

1. Field of the Invention

The present invention relates generally to regeneration of adsorbents, and more particularly, to a method of removing organic materials by adsorbents and regenerating the adsorbents using advanced oxidation.

2. Description of the Related Art

In the past, it has been desired to remove organic materials such as toxic organic contaminants from fluids such as water or air. One method which has been used for removing organic material from water or air is adsorption using adsorbents such as granular activated carbon (GAC). An example of such a method is disclosed in U.S. Pat. No. 4,861,484 to Lichten et al., the disclosure of which is hereby incorporated by reference. The Lichten et al. patented method includes treating water polluted with organic material by passing the polluted water through GAC such that the organic material is removed and adsorbed onto the GAC.

One problem with using GAC to remove organic material from water or air is that the spent GAC is, in some cases, considered as hazardous waste and requires proper disposal and/or treatment. For example, the spent GAC may be disposed in a hazardous waste landfill or incinerated. For large water treatment facilities, on-site thermal reactivation of the adsorbed GAC may be used.

However, for small water treatment utilities, GAC usage rates may not be large enough to justify on-site thermal reactivation. Also, hazardous waste landfills or incinerators may not be available. Therefore, a need exists for on-site regeneration of spent adsorbents such as GAC and the destruction of the adsorbed organic material.

One attempt to regenerate spent adsorbents is disclosed in the above-identified Lichten et al. '484 patent. The Lichten et al. patented method includes mixing the adsorbed GAC with an organic solvent such that the organic material becomes dissolved in the organic solvent and the GAC is regenerated in a form substantially free of adsorbed organic material.

One problem with the above patented method is that the organic solvent has to be treated or disposed to destroy the organic material. This is undesirable and costly since extra handling and process steps are used. Another problem is that an organic solvent has to be used to regenerate the GAC. This is also undesirable, costly, and requires additional handling.

SUMMARY OF THE INVENTION

It is, therefore, one object of the present invention to provide a method of regeneration of adsorbents.

It is another object of the present invention to provide a method of regeneration of adsorbents using advanced oxidation.

It is yet another object of the present invention to directly destroy the adsorbed organic material on the adsorbents.

It is still another object of the present invention to provide a method of on-site regeneration of spent adsorbents.

To achieve the foregoing objects, the present invention is a method of purifying fluid having organic material. The method includes two operational steps. The first step includes the treatment of the fluid by passing the fluid through an adsorbent such that the organic material is substantially adsorbed and the fluid is substantially purified. The second step includes the destruction of the adsorbed organic material on the adsorbent and the regeneration of the adsorbent in a form substantially free of adsorbed organic material by using advanced oxidation.

One advantage of the present invention is that on-site regeneration of spent adsorbents and destruction of adsorbed organic material is provided. Another advantage of the present invention is that the use of an organic solvent is eliminated. Yet another advantage of the present invention is that the adsorbed organic material is destroyed or mineralized on the adsorbent into nontoxic forms such as $CO_2$, $H_2O$, $Cl^-$, etc. Another advantage of the present invention is that a broad spectrum of organic chemicals can be effectively destroyed. Still another advantage of the present invention is that the adsorbents can be used and reused for multiple regeneration cycles. A further advantage of the present invention is that solar radiation can be utilized. Still a further advantage of the present invention is that the loss of adsorbents due to attrition and burn-off which occurs in thermal reactivation is less.

Other objects, features and advantages of the present invention will be readily appreciated as the same becomes better understood after reading the following description.

DESCRIPTION OF THE PREFERRED EMBODIMENT(S)

Generally, the present invention involves two operational steps of: 1) passing fluid having organic material through an adsorbent such that the organic material is substantially adsorbed by the adsorbent and the fluid is substantially purified; and 2) destroying the adsorbed organic material on the adsorbent and regenerating the adsorbent in a form substantially free of adsorbed organic material.

In accordance with the first step of the present invention, fluid contaminated with or having organic material is obtained. As an example, water is a preferred fluid utilized. The organic material may be organic alkenes and alkanes, polychlorinated phenols, aromatics, or other compounds amenable to removal by adsorption.

In the second step of the present invention, the contaminated fluid is passed through an adsorbent such that the organic material is substantially adsorbed by the adsorbent and the fluid is substantially purified. Preferably, the adsorbents are loaded in an adsorption column for fixed-bed adsorption. The adsorbents may be granular activated carbon (GAC) or synthetic adsorbents. In the preferred embodiment, granular activated carbon (GAC) is a preferred adsorbent. Such an adsorbent may be a GAC such as F-400 GAC produced by Calgon Carbon Company (Pittsburgh, Pa.) and SC GAC produced by Barnebey & Sutcliffe Corporation (Columbus, Ohio) or a synthetic adsorbent such as Ambersorb resin produced by Rohm and Haas Corporation (Philadelphia, Pa.).

In the preferred embodiment, regeneration of the adsorbents is carried out using advanced oxidation. Advanced oxidation involves the generation of highly reactive intermediates which can completely destroy or mineralize organic material into nontoxic forms, such as carbon dioxide ($CO_2$) and water ($H_2O$). Advanced oxidation may use metal catalysts or semiconductors. The metal catalysts may be $TiO_2$, $Pt-TiO_2$, $Pt-TiO_2-RuO_2$, $SnO_2$, $ZrO_2$, $Ta_2O_5$, $Nb_2O_5$, $KTaO_3$, $SrTiO_3$, $NiO-SrTiO_3$, $BaTiO_3$, $WO_3$, $Pb_2Ti_{1.5}W_{0.5}O_{6.5}$, CdO $CdFe_2O_4$, $Fe_2O_3$, $PbFe_{12}O_{19}$, $Hg_2Nb_2O_7$. It should be appreciated that other suitable metal-oxide catalysts may be used.

The catalysts may be suspended in a solution with the adsorbents or impregnated on the adsorbents. Preferably, the catalysts are impregnated on the adsorbents. For example, the SC GAC (60×80 mesh) was impregnated with $TiO_2$ and the F-400 GAC (60×80 mesh) was impregnated with platinized $TiO_2$ ($Pt-TiO_2$) which may be anatase powder (high purity 99.9+%) produced by Aldrich Chemical Co. The impregnation method was performed using conventional boiling deposition, in which slurry solutions of $TiO_2$ and adsorbents were boiled until the water was dried out. The SC GAC may be impregnated in $TiO_2$ solutions ranging in concentrations from 1% to 10% by weight. The F-400 GAC may be impregnated in a $Pt-TiO_2$ solution with a concentration of 10% by weight using boiling deposition method. It should be appreciated that other methods are also possible such as the sol-gel process.

In the second step of the present invention, energy is added to metal catalysts and the adsorbed organic material is destroyed on the adsorbent. The radiation or energy sources for the activation of the catalysts and destruction of the adsorbed organic material may be solar light or artificial light. Examples of artificial light are low intensity light using black light fluorescence bulbs or high intensity light using high-pressure mercury-vapor lamps. It should be appreciated that the metal catalysts may be activated by using alternate sources such as gamma radiation or electrically applied potentials.

The primary oxidant responsible for the oxidation of organic compounds is the highly reactive hydroxyl radical (OH*). When activated with sufficient high energy, the photoreactive catalysts will absorb energy, resulting in the excitation of electrons ($e_{cb}^-$) to the conduction band while leaving an electronic vacancy called a hole ($h_{vb}^+$) in the valence band. The minimum amounts of energy which are required for exciting the electrons are called "band-gap energies." For example, $TiO_2$ has a band-gap energy of 3.0–3.3 eV, which is equivalent to the wavelength of light between 376 and 413 nm.

The electron-hole pairs, which are generated by the activation of metal catalysts, will produce the hydroxyl radicals. There are two major pathways in which hydroxyl radicals can be formed: one pathway is by the reactions of $h_{vb}^+$, and the other by the reactions of $e_{cb}^-$. The $h_{vb}^+$ reacts with either $H_2O$ or $OH^-$ adsorbed on the surface to directly form OH*. The $e_{cb}^-$ reacts with adsorbed oxygen to produce a superoxide-ions radical ($O_2^{-*}$), from which $H_2O_2$ is produced through the formation of $HO_2^*$ and $HO_2^-$. The hydroxyl radicals are produced from the breakdown of $H_2O_2$ molecules by radiation or $e_{cb}^-$.

Typically, the activation energy is added over a period of time such as days. The adsorbed organic material is destroyed or mineralized on the adsorbent. The adsorbent is regenerated in a form substantially free of adsorbed organic material. Since the organic material is destroyed or mineralized on the adsorbent, onsite regeneration of the adsorbents occurs.

Now, the present invention will be described more specifically below with reference to the following examples. It should be noted, however, that the present invention is not limited to these examples which are described for exemplary purposes.

EXPERIMENTAL DESIGN AND GENERAL PROTOCOL

To carry out the following examples to be described, a Rapid Small Scale Column Test (RSSCT) or adsorption unit was set up in a temperature-controlled room where a temperature of 12°–14° C. was maintained. The unit was constructed using glass, teflon, and stainless steel to minimize the loss of the organic due to adsorption by construction materials. Glass columns (Ace Glass, Inc.) of 1.1 cm in diameter were used for the RSSCT columns.

A concentrated feed solution of the organic material or compound was prepared and stored in a headspace-free 50-liter teflon gas-sampling bag. The concentrated solution was slowly drawn from the bag by a chemical feed pump at a flow rate of approximately 0.5–2.0 ml/min and mixed with clean water in a 13-liter mixing tank. The flow rate through the RSSCT column was supplied by a positive displacement pump at approximately 30 ml/min. The design and operation of the regeneration unit will be described under each of the following examples to be described.

During the regeneration, samples will be periodically taken and analyzed for the concentrations of organic compounds and chloride ions which were produced from the destructive oxidation. Organic compounds were analyzed by direct aqueous injection into a gas chromatograph (Hewlett-Packard, Mt. View, CA Model 5880A) which was equipped with an electron capture detector. Chloride-ion concentrations were determined by using a Ion-Chromatograph (Dionex Corp. Itasca, Ill., Model 13). Ph was measured by using a pH-meter (Orion Research, Cambridge, Mass., Model 501) and dissolved oxygen (DO) was measured by using a DO meter (Yellow Spring Instrument Co., Yellow Springs, Ohio, Model 54).

Potassium ferrioxalate actinometry was used to obtain an estimate of the incident light intensity received by the solution in the regeneration unit. A quantum-yield value of 1.21 for the ferrous ions and a measured molar extinction coefficient of $1.095 \times 10^{-4}$ L/mole.cm for the ferrous phenanthroline complex were used in the calculations of light intensities. It should be noted that this actinometric method measures the intensity of light with wavelengths from 250 to 577 nm, some of which have lower energy than those needed for the excitation of $TiO_2$ (<413 nm.).

EXAMPLE I

Regeneration using $TiO_2$-Slurry and Solar Radiation

For this example, F-400 carbon (Calgon) and Ambersorb XEN-572F resin (Rohm and Haas) were used as adsorbents. Three (3) grams of each adsorbent were loaded with chloroform in RSSCT columns at a concentration of about 130–150 μg/L at 14° C. After loaded with chloroform until exhausted, each adsorbent was regenerated in a regeneration unit. The regeneration unit was a cylindrical vessel having a diameter of 12.5 cm and a height of 3.5 cm. The regeneration unit contained a $TiO_2$-suspended aqueous solution with a volume of 200 ml while the adsorbent particles settled down at the bottom of the regeneration unit. The $TiO_2$ catalyst used was a high purity (99.9+%) anatase powder (Lot #09205pp) obtained from Aldrich Chemical Co. (Milwaukee, Wis.). The regeneration solution was periodically (every 3-4 hrs) stirred in order to keep the $TiO_2$ particles suspended in the solution. Several regeneration units were simultaneously conducted in order to determine the effect of $TiO_2$ dosage (a blank which contained no $Tio_2$, 0.05, 0.1, 0.2, and 0.4% by wt).

In order to minimize the loss of chloroform due to volatilization, the regeneration unit was covered with a commercial plastic wrap. The pH of the regeneration solutions was maintained around a pH of 7.0 by periodically adding a few drips of 1-N NaOH solution. The dissolved-oxygen (DO) concentrations for the regeneration solutions were measured to be near the equilibrium values during the regeneration.

Sun light was used to activate the $TiO_2$ in the regeneration unit. Everyday, a 10-ml sample was taken from each regeneration unit one hour after the sun was set. After each sampling, 10 ml of a $TiO_2$ solution with the same $TiO_2$ concentration as that in the regeneration unit was added into the reactor in order to maintain the solution volume and $TiO_2$ dosage. The samples were analyzed for chloroform and chloride ion. The regeneration cycle was continued until no chloroform or by-products were detected. The regeneration period was approximately forty-eight (48) days. The daily average amount of photons received by a regeneration unit was about 0.73 $\mu$Einstein/$cm^2$/min. The temperature of the regeneration solutions varied from 6° to 38° C.

It was found that both F-400 carbon and Ambersorb XEN-572F resin could be completely regenerated and no chloroform was detected in the regeneration units for all the $TiO_2$ dosages (except for the control blanks). The mass of chloride ions produced from the oxidation was measured to be close to that calculated from stoichiometry, assuming chloroform was completely destroyed. The shortest times for the complete regeneration were obtained at a $TiO_2$ dosage of 0.2% for both adsorbents. After regeneration, the adsorbents were reloaded with chloroform and the capacity recoveries were found to be over ninety percent (90%).

EXAMPLE II

Regeneration using $TiO_2$-Slurry and Artificial Light

For this example, F-400 GAC (Calgon), Ambersorb-572 and Ambersorb-563 resins (Rohm and Haas) were used as adsorbents. The Ambersorb-572 resin is an improved version of Ambersorb XEN-572F resin which was used for the previous example. One (1) gram of each adsorbent was loaded in a RSSCT column with water containing trichloroethylene (TCE) at a concentration of 170-200 $\mu$g/L at 14° C.

After being loaded with TCE, the adsorbents were regenerated in the regeneration units similar to those used for the regeneration using slurry-$TiO_2$ and solar radiation. Each regeneration unit contained a 200-ml $TiO_2$-slurry solution which was illuminated with two light sources: 1) low intensity light using three 40-watt black light fluorescence bulbs (North American Phillips Lighting Corp., Bloomfield, N.J., Model F40BLB), and 2) high intensity light using a 450-watt Hanovia high-pressure mercury-vapor lamp (Ace Glass Co., Vineland, N.J.). The light bulbs or the lamp were placed horizontally 1 cm above the regeneration unit. The incident light intensities received by the regeneration unit from low and high intensity lights were measured by ferrioxalate actinometry to be about 0.69 and 2.65 $\mu$Einstein/$cm^2$/min, respectively.

The $TiO_2$ catalyst used in this study was high-purity (99.9+%) anatase powder produced by Aldrich Chemical Co. (Lot #09205pp). The $TiO_2$ dosage used for the regeneration was 0.1% by wt. The regeneration was conducted at a room temperature (approximately 24° C.). The pH of the regeneration solutions was maintained about a value of 7.0 by periodically adding a few drops of 1-N NaOH.

Every 48 hours of regeneration, a 15-ml sample of regeneration solution was taken from each regeneration unit one hour after the light was turn off. The sample was analyzed for the concentration of TCE and chloride ion to determine the completeness of regeneration. After each sampling, 15 ml of a 0.1% $TiO_2$ solution was added into the regeneration unit in order to maintain constant solution volume and $TiO_2$ dosage.

After being loaded with TCE for 10 days, the adsorbents were regenerated using black light fluorescence bulbs as the near-UV source for 20 days. It was found that the rates of chloride production for all the adsorbents were slow. The adsorbents were then regenerated using a higher intensity light source, 450-watt Hanovia high-pressure mercury-vapor lamp for another 4 days; however, no dramatic change in chloride production was observed.

For F-400 carbon, regeneration rates for chloroform was much faster than that for TCE. F-400 carbon loaded with chloroform could be completely regenerated using $TiO_2$-slurry regeneration units and solar radiation with regeneration times shorter than about twice the adsorption times. Contrarily, the complete regeneration of adsorbents loaded with TCE would require regeneration times longer than ten times the adsorption time.

EXAMPLE III

Regeneration of Photocatalyst-Impregnated Adsorbents

For this example, the adsorbents used were SC GAC produced by Barnebey & Sutcliffe Corporation (Columbus, Ohio), F-400 GAC produced by the Calgon Corporation (Pittsburgh, Pa.). The SC GAC (60×80 mesh) was impregnated with $TiO_2$ and the F-400 GAC (60×80 mesh) was impregnated with platinized $TiO_2$. The $TiO_2$ used was anatase powder (high purity 99.9+%) produced by Aldrich Chemical Co. The impregnation method was performed using boiling deposition method, in which slurry solutions of $TiO_2$ and adsorbents were boiled until the water was dried out. The SC GAC was impregnated in $TiO_2$ solutions with three different concentrations, i.e., 1, 5, and 10% by wt. The F-400 GAC was impregnated in a Pt-$TiO_2$ solution with a concentration of 10% by wt using boiling deposition.

Three (3) grams of impregnated adsorbents were loaded with TCE at a concentration of 160-190 $\mu$g/L in RSSCT columns and were transferred to the regeneration units initially containing deionized-distilled (DD) water of 500 ml. The regeneration units were square aluminum containers with a width of 20 cm and a height of 5 cm. The interior surface of each regeneration unit was lined with a teflon sheet. The illumination sources were the same as those used for the regeneration using $TiO_2$-slurry reactors and artificial light. The incident light intensities for this regeneration unit were measured by ferrioxalate actinometry to be about 0.35 and 2.12 μEinstein/cm$^2$/min for low and high intensity lights, respectively.

A 15-ml sample of regeneration solution was periodically taken from each regeneration unit after the light was turned off in order to examine the completeness of the regeneration. After each sampling, 15 ml of DD water was added into the regeneration unit in order to maintain a constant solution volume.

For the TiO$_2$-impregnated SC GACs, the adsorbents were loaded with TCE in RSSCT columns for 20 days. After being loaded with TCE, the adsorbents were regenerated using the black light fluorescence bulbs as the near-UV source for the same period of time. It was found that the adsorbents were not completely regenerated with the low intensity light. The SC GAC impregnated in a 10% TiO$_2$ solution was then regenerated using high intensity light, 450-watt Hanovia high-pressure mercury-vapor lamp. A significant increase in regeneration rate was observed. The adsorbent was regenerated until no TCE was detected after the lamp was turned off for one (1) hour. The complete regeneration was obtained with a total regeneration time of forty (40) days which was about twice the adsorption time.

For the Pt-TiO$_2$ impregnated F-400 GAC, the adsorbent was loaded with TCE until exhausted (with an adsorption time of 15 days). After being loaded with TCE, the adsorbent was regenerated with 450-watt mercury-vapor lamp. It was found that the adsorbent was completely regenerated with a regeneration time of three (3) days, which was one-fifth of the adsorption time. The adsorbent was then reloaded with TCE and regenerated for the second cycle. The adsorbent was also completely regenerated within three (3) days in the second regeneration.

When comparing the regeneration rate of impregnated F-400 carbon and non-impregnated F-400 carbon, it can be seen that the former was much faster than the latter. The regeneration rate of impregnated adsorbent was enhanced by the destructive reactions on the exterior surface of the impregnated adsorbents.

The present invention has been described in an illustrative manner. It is to be understood that the terminology which has been used is intended to be words of description rather than of limitation.

Many modifications and variations of the present invention are possible in light of the above teachings. Therefore, within the scope of the appended claims, the present invention may be practiced otherwise than as specifically described.

What is claimed is:

1. A method of purifying fluid having organic material, said method comprising the steps of:
   passing the fluid through an adsorbent having a photoreactive catalyst such that the organic material is substantially adsorbed by the adsorbent and the fluid is substantially purified; and
   destroying the adsorbed organic material on the adsorbent by substantially only photo-energy and regenerating the adsorbent in a form substantially free of adsorbed organic material.

2. A method as set forth in claim 1 wherein the photoreactive catalyst is impregnated on the adsorbent.

3. A method as set forth in claim 1 wherein the photoreactive catalyst is suspended in solution with the adsorbent.

4. A method as set forth in claim 1 wherein the photoreactive catalyst is an oxide of a transition element.

5. A method as set forth in claim 1 wherein the photoreactive catalyst is titanium dioxide.

6. A method as set forth in claim 1 wherein the photoreactive catalyst is selected from the group consisting of TiO$_2$, Pt-TiO$_2$, SnO$_2$, ZrO$_2$, and Fe$_2$O$_3$.

7. A method as set forth in claim 1 wherein the adsorbent is granular activated carbon.

8. A method as set forth in claim 1 wherein said step of destroying includes adding photoenergy to the adsorbent.

9. A method as set forth in claim 8 wherein the photoenergy is solar radiation.

10. A method as set forth in claim 8 wherein the photoenergy is artificial light.

11. A method as set forth in claim 1 wherein the adsorbent is a synthetic composition.

12. A method as set out in claim 1 wherein the photoreactive catalyst is selected from the group consisting of: TiO$_2$, Pt-TiO$_2$, Pt-TiO$_2$-RuO$_2$, SnO$_2$, ZrO$_2$, Ta$_2$O$_5$, Nb$_2$O$_5$, KTaO$_3$, SrTiO$_3$, NiO-SrTiO$_3$, BaTiO$_3$, WO$_3$, Pb$_2$Ti$_{1.5}$W$_{0.5}$O$_{6.5}$, CdO, CdFe$_2$O$_4$, Fe$_2$O$_3$, PbFe$_{12}$O$_{19}$, Hg$_2$Nb$_2$O$_7$.

13. A method of purifying water contaminated with organic material, said method comprising the steps of:
   passing the contaminated water through granular activated carbon impregnated with a photoreactive catalyst;
   adsorbing the organic material on the granular activated carbon such that the water is substantially purified;
   adding photoenergy to the granular activated carbon and absorbing the photoenergy by the photoreactive catalyst;
   destroying the adsorbed organic material on the surface of the granular activated carbon by substantially only photo-energy; and
   regenerating the granular activated carbon in a form substantially free of adsorbed organic material.

14. The method of claim 13 wherein said photoreactive catalyst triggers an advanced oxidation process when sufficient photoelectric energy is absorbed.

15. A method of purifying water contaminated with organic material, said method comprising the steps of:
   passing the contaminated water through synthetic adsorbent impregnated with a photoreactive catalyst;
   adsorbing the organic material on the synthetic adsorbent such that the water is substantially purified;
   adding photoenergy to the synthetic adsorbent and adsorbing the photoenergy by the photoreactive catalyst;
   destroying the adsorbed organic material on the surface of the synthetic adsorbent by substantially only photo-energy; and
   regenerating the synthetic adsorbent in a form substantially free of adsorbed organic material.

16. The method of claim 15 wherein said photoreactive catalyst triggers an advanced oxidation process when sufficient photoelectric energy is absorbed.

* * * * *